A. WAAG.
MATCH BOX.
APPLICATION FILED OCT. 24, 1908.

914,208.

Patented Mar. 2, 1909.

2 SHEETS—SHEET 1.

Witnesses
A. H. Rabsag,
K. H. Butler

Inventor
A. Waag.

By H. C. Everett
Attorneys

A. WAAG.
MATCH BOX.
APPLICATION FILED OCT. 24, 1908.
914,208.
Patented Mar. 2, 1909.
2 SHEETS—SHEET 2.
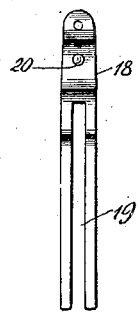
Fig. 7.
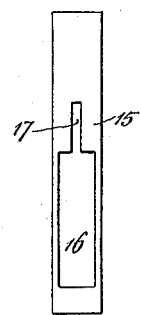
Fig. 8.
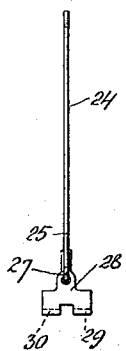
Fig. 9.
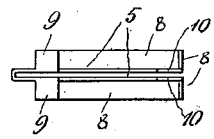
Fig. 10.
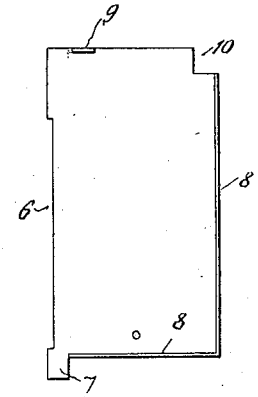
Fig. 11.
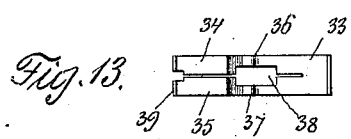
Fig. 12.
Fig. 13.
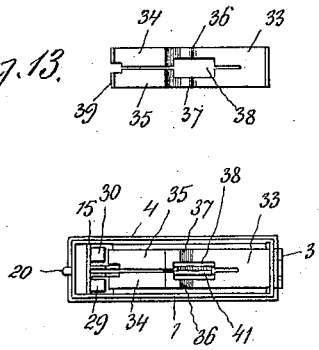
Fig. 14.
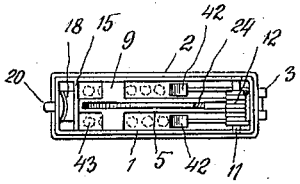
Fig. 15.
Witnesses
A. H. Rabsag,
K. H. Butler
Inventor
A. Waag.
By H. C. Everet
Attorneys

UNITED STATES PATENT OFFICE.

ANDREW WAAG, OF PERRYSVILLE, PENNSYLVANIA.

MATCH-BOX.

No. 914,208.  Specification of Letters Patent.  Patented March 2, 1909.

Application filed October 24, 1908. Serial No. 459,289.

*To all whom it may concern:*

Be it known that I, ANDREW WAAG, a citizen of the United States of America, residing at Perrysville, in the county of Allegheny and State of Pennsylvania, have invented certain new and useful Improvements in Match-Boxes, of which the following is a specification, reference being had therein to the accompanying drawing.

This invention relates to a match box, and the primary object of my invention is the provision of positive and reliable means in connection with a match box for elevating a match when the match lid is open, whereby the match can be easily withdrawn from the box.

A further object of this invention is to provide simple and effective means in a match box for feeding the matches thereof to the forward edge to permit of said matches being easily withdrawn.

A still further object of this invention is to provide a simple and inexpensive match box having a match delivering mechanism automatically actuated by the opening of the match box lid.

With the above and other objects in view which will more readily appear as the invention is better understood, the same consists in the novel construction, combination and arrangement of parts to be hereinafter described and then specifically claimed.

Figure 1:
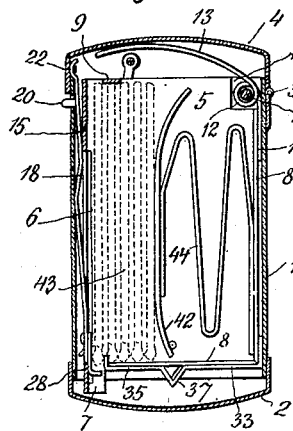
Figure 2:
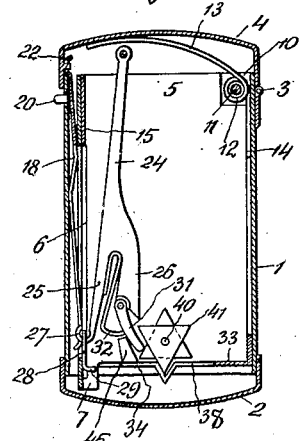
Figure 3:
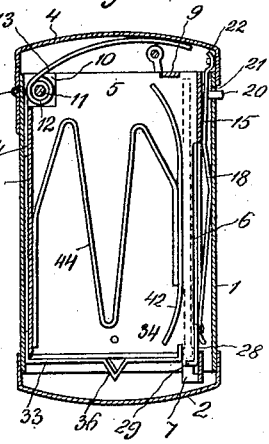
Figure 4:
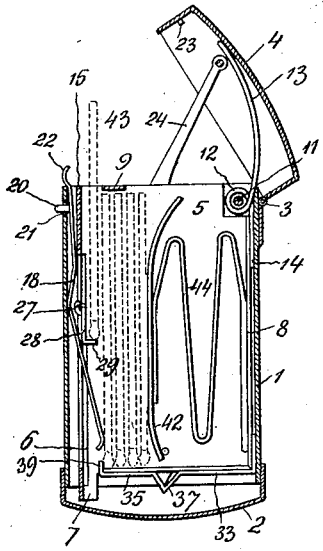
Figure 5:
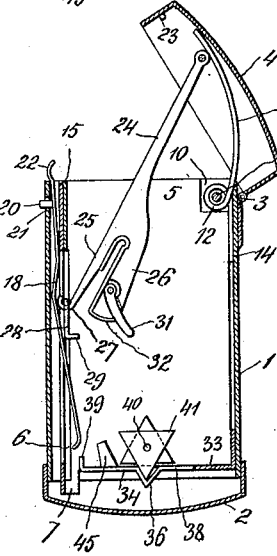
Figure 6:
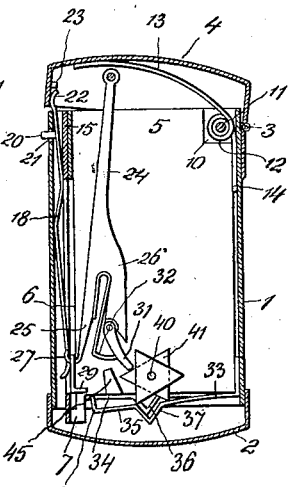

In the drawings:—Figure 1 is a vertical sectional view of a match box with the right side thereof cut away, Fig. 2 is a central vertical sectional view, Fig. 3 is a similar view of the left side thereof cut away, Fig. 4 is a vertical sectional view of the right side thereof cut away illustrating the lid in an open position, Fig. 5 is a central vertical sectional view of the lid in an open position, Fig. 6 is a similar view with the lid partially closed, Fig. 7 is a front elevation of the lid clasp, Fig. 8 is a front elevation of the guard used in a match box, Fig. 9 is a front elevation of the lid lever, Fig. 10 is a plan of the central partition of the match box, Fig. 11 is a side elevation of the same, Fig. 12 is a side elevation of a resilient detent forming a part of the match box mechanism, Fig. 13 is a plan of the same, Fig. 14 is a bottom plan of the box with the bottom lid or cover thereof removed, and Fig. 15 is a plan of the box with the hinged lid thereof removed.

In the accompanying drawings, 1 designates an oblong metallic casing having the lower end thereof provided with a fixed lid or cover 2, and connected to the upper end of said casing by a hinge 3 is a lid 4.

Located within the casing 1 is a double central partition, preferably made of a single piece of metal bent upon itself to provide two parallel plates 5, these plates at the meeting edges being cut away and slotted, as at 6, and provided with depending lugs 7. The bottom and rear edges of these plates are flanged, as at 8, and the upper edges of said plates are provided with lateral lugs 9, these lugs together with the flanges 8 assisting in maintaining the partitions central of the casing 1. The upper edges of the plates 5 are cut away, as at 10, to provide clearance for a transverse pin 11 upon which is mounted a spring 12, the long end 13 of said spring bearing against the lid 4, while the shorter end 4 thereof bears against the rear inner side of said casing. The spring 12 is employed for quickly and automatically opening the lid 4, when said lid is released. Soldered or otherwise secured to the forward edge of the central partition is a vertical guard 15 having a wide and longitudinal slot 16 contracted at its upper end, as at 17.

Located between the guard 15 and the forward inner side of the casing 1 is a resilient clasp 18 having the lower end thereof bifurcated, as at 19, to extend through the slot 16 when the mechanism is actuated to deliver a match. The upper end of the clasp 18 is provided with a forwardly projecting pin 20 adapted to extend through an opening 21 formed in the forward side of the casing 1. The extreme end of the clasp 18 is bent and apertured, as at 22, to engage over an inwardly projecting pin 23 carried by the forward inner side of the lid 4. When the pin 21 is pushed inwardly, the clasp is moved out of engagement with the pin 23 and the spring 12 is permitted to open the lid 4. Pivotally mounted in the lid 4 is a depending lever 24, this lever extending between the plates 5 of the central partition. The lower end of the lever is bifurcated to provide two arms 25 and 26, the former being hook-shaped, as at 27, to support a pivoted elevating member 28 having two ledges 29 and 30. Pivotally connected to the arm 26 is a pawl 31, and engaging said pawl is a spring 32 mounted in the bifurcation of the lever 24.

Secured to the underneath side of the flanges 8 at the rear edge of the central partition is a resilient detent 33, said detent being bifurcated to provide two prongs 34 and 35, these prongs being provided with central V-shaped depressions 36 and 37 respectively. The confronting edges of the prongs are cut away to provide a central opening 38 and the forward ends of said prongs are provided with upwardly extending lugs 39, for an object that will presently appear.

Journaled transversely of the plates 5 adjacent to the lower edges thereof is a pin 40 and mounted upon said pin is a star wheel 41, said star wheel being actuated by the pawl 31 to depress the prongs 34 and 35, said star wheel extending downwardly into the central opening 38 of the detent and engaging the inner edges of the V-shaped depressions 36 for alternately depressing the prongs 34 and 35. The star wheel 41 is preferably made of two triangular plates positioned upon the pin 40, whereby the corners of said plates will provide equally spaced teeth, the teeth of one plate being adapted to engage the prongs 34, while the teeth of the other plate engage the prongs 35.

Arranged within the casing 1 upon each side of the central partition is a match feeder 42 for normally forcing matches 43 toward the forward side of the casing, this match feeder being actuated by a spring 44 interposed between the feeder and the vertical flanges 8 of the central partition. To limit the movement of the pawl 31, a block 45 is interposed between the lower edges of the plates 5, whereby the pawl 31 will be retained in engagement with the star wheel 41 when the lever 24 is lowered. With the lid 4 in an open position, the matches 43 are inserted in front of the feeder 42, whereby said matches will be forced forwardly against the guard 15 beneath the lugs 9, said matches being supported upon the lateral flanges 8 of the central partition. When the lid 4 is closed, the elevating member 28 is lowered forcing the bifurcated end 19 of the lid clasp forward. When the pawl 31 of the lever 24 strikes the star wheel 41, one of the prongs 34 or 35 is lowered, allowing the feeder 42 to force a match forward upon one of the ledges 29 or 30 of the elevating member. When the pin 21 is pushed inwardly to release the lid clasp 18, the spring 13 opens the lid 4, causing the lever 24 to elevate together with the member 28. The match resting upon one of the ledges of the elevating member will be raised to the dotted position shown in Fig. 4 of the drawings, and can be easily removed from the casing. When the lid 4 is again closed, the star wheel 41 is actuated to move another one of the prongs of the resilient detent 33, to release the match and allow the feeder 42 to move the same to the elevating member. The resilient detent 33 controls the movement of the matches on to the elevating member and regulates the delivery of the match, whereby a match will be delivered from one side of the partition and one from the other. The lugs 9 prevent more than one match from being elevated as might be caused by frictional contact of the matches, and the bifurcated end of the clasp retains the lower ends of the matches in position during the elevation of the member 28.

While in the drawings forming a part of this application there is illustrated the preferred embodiments of my invention, it is to be understood that the same can be varied or changed as to shape, proportion and manner of assemblage without departing from the spirit of the invention.

Having now described my invention, what I claim as new, is:—

1. A match box embodying a casing, a spring actuated lid hinged thereto, a central vertical partition arranged in said casing and comprising two parallel plates having lateral spacing flanges and lugs, a guard mounted upon the forward end of said partition, said guard having a slot formed therein, a lid clasp interposed between said casing and said guard and having a bifurcated end extending through the slot of said guard for engaging matches within said casing, a pivoted lever carried by said lid and extending downwardly between the plates of said partition, a pivoted elevating member carried by said lever for elevating a match at each side of said partition, a resilient pronged detent located at the bottom of said partition for controlling the movement of matches upon said elevating member, a star wheel journaled between the plates of said partition for alternately actuating said detents, a pawl carried by said lever for moving said star wheel when said lid is closed, and a spring pressed feeder arranged at each side of said partition for moving matches forwardly to said elevating member.

2. A match box embodying a casing, a hinged lid carried thereby, a simple vertical partition arranged in said casing and having lateral match supporting flanges, a guard secured to the forward edge of said partition, a lid clasp arranged between said guard and said casing and having a bifurcated end for engaging matches upon each side of said partition, a lever carried by said lid, an elevating member carried by said lever for raising a match upon each side of said partition, a resilient pronged detent arranged at the lower edge of said partition for controlling the movement of matches on said elevating member, a star wheel journaled in said partition for alternately actuating the prongs of said detent, a pawl carried by said lever for moving said star wheel when said lid is closed, and a match feeder arranged at each side of said casing for moving matches forwardly on the said elevating member.

3. A match box comprising a casing, a hinged lid carried thereby, a partition arranged centrally of said casing and having lateral match supporting flanges, a guard carried by said partition, a lever carried by said lid, an elevating member carried by said lever and adapted to be raised by the opening of said lid, a pronged detent arranged at the lower end of said partition for controlling the movement of matches on the said elevating member, a star wheel carried by said partition for alternately actuating the springs of said detent to release matches, a pawl carried by said lever for actuating said star wheel when the lid of said box is closed, a feeder arranged at each side of said partition for moving matches forwardly to said elevating member, and means for securing said lid in a closed position.

4. A match box comprising a casing, a hinged lid carried thereby, a partition arranged centrally of said casing and having lateral match supporting flanges, a guard carried by said partition, a lever carried by said lid, an elevating member carried by said lever and adapted to be raised by the opening of said lid, a pronged detent arranged at the lower end of said partition for controlling the movement of matches on the said elevating member, a star wheel carried by said partition for alternately actuating the springs of said detent to release matches, a pawl carried by said lever for actuating said star wheel when the lid of said box is closed, and a feeder arranged at each side of said partition for moving matches forwardly to said elevating member.

5. A match box comprising a casing, a hinged lid carried thereby, a partition arranged centrally of said casing and having lateral match supporting flanges, a lever carried by said lid, an elevating member carried by said lever and adapted to be raised by the opening of said lid, a pronged detent arranged at the lower end of said partition for controlling the movement of matches on the said elevating member, a star wheel carried by said partition for alternately actuating the springs of said detent to release matches, a pawl carried by said lever for actuating said star wheel when the lid of said box is closed, and a feeder arranged at each side of said partition for moving matches forwardly to said elevating member.

6. A match box comprising a casing, a hinged lid carried thereby, a partition arranged in said casing a lever carried by said lid for elevating matches within said casing, a resilient pronged detent for controlling the positioning of said matches for elevation, a star wheel arranged in said partition and operated by said lever for alternately actuating the prongs of said detent to release matches, a feeder arranged at each side of said partition for moving matches forwardly to a position to be elevated, and means for opening said lid when released.

7. A match box comprising a casing, a hinged lid carried thereby, a partition arranged in said casing, a lever carried by said lid for elevating matches within said casing, a resilient pronged detent for controlling the positioning of said matches for elevation, a star wheel arranged in said partition and operated by said lever for alternately actuating the prongs of said detent to release matches, and a feeder arranged at each side of said partition for moving matches forwardly to a position to be elevated.

8. A match box comprising a casing, a hinged lid carried thereby, a partition arranged in said casing, a lever carried by said lid for elevating matches within said casing, a resilient pronged detent for controlling the positioning of said matches for elevation, and a star wheel arranged in said partition and operated by said lever for alternately actuating the prongs of said detent to release matches.

9. A match box comprising a casing, a hinged lid carried thereby, a partition arranged in said casing, a lever carried by said lid and adapted to alternately elevate matches at each side of said partition, a pronged detent arranged at the lower end of said partition for controlling the positioning of matches for elevation, and a feeder at each side of said partition for moving matches forwardly to be elevated.

In testimony whereof I affix my signature in the presence of two witnesses.

ANDREW WAAG.

Witnesses:
  MAX H. SROLOVITZ,
  K. H. BUTLER.